H. O. WISCHNER.
APPARATUS FOR SEPARATING OIL FROM STEAM.
APPLICATION FILED JULY 30, 1912.

1,062,264.

Patented May 20, 1913.

UNITED STATES PATENT OFFICE.

HEINRICH OSKAR WISCHNER, OF LEIPZIG-ENTRITZSCH, GERMANY.

APPARATUS FOR SEPARATING OIL FROM STEAM 1,062,264.  Specification of Letters Patent.  Patented May 20, 1913.

Application filed July 30, 1912. Serial No. 712,313.

*To all whom it may concern:*

Be it known that I, HEINRICH OSKAR WISCHNER, tinker, subject of the King of Saxony, Germany, residing at Leipzig-Entritzsch, Germany, have invented new and useful Improvements in Apparaus for Separating Oil from Steam, of which the following is a specification.

The known apparatus for separating oil from steam by means of parallel separating elements are in a greater or less degree unsatisfactory owing to the fact that the oil deposited on the separating elements is liable to be again taken up by the steam; moreover the manner in which the separated oil is conducted to the oil collector is unsatisfactory.

The present invention provides an improved steam and oil separator in which, for the purpose of efficiently separating the oil, continuous, separate oil draining chambers are arranged at the sides of the steam path so that they are outside the passage of the steam, the said chambers being arranged on a bed plate having ridges or bosses and channels whereby the oil is efficiently conducted to the collecting chamber.

The invention is illustrated in the accompanying drawing in which:—

Figure 1:
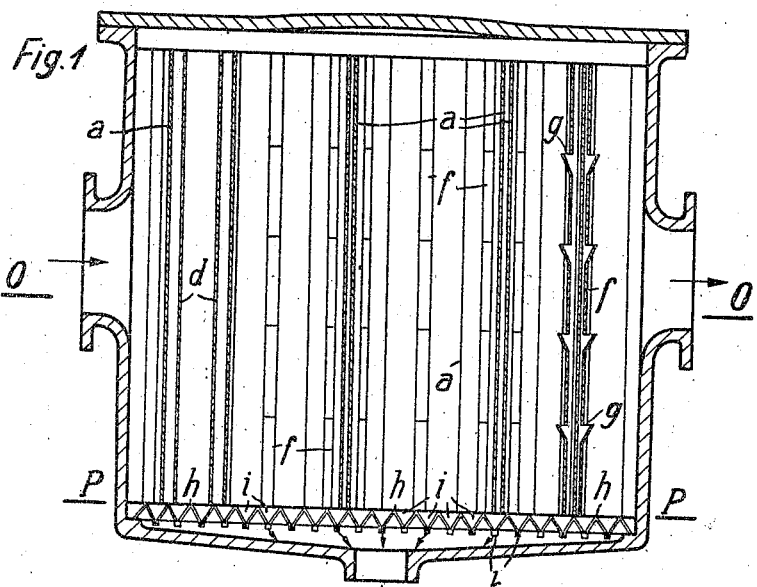
Figure 2:
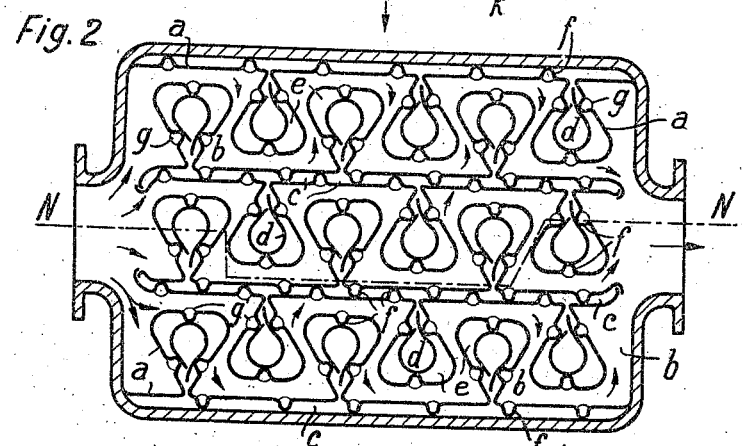
Figure 3:
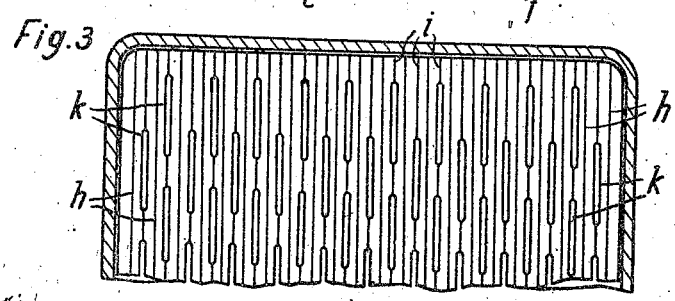

Figure 1 is a longitudinal section of the oil separator on the line N—N of Fig. 2, and Figs. 2 and 3 are plans in section in the lines O—O and P—P respectively of Fig. 1.

In the apparatus illustrated the partition walls $a$ are provided at intervals with protuberances of pear shaped cross section. These protuberances are arranged in staggered relation to one another in such manner that the protuberances of one wall enter the gaps between the protuberances of the other wall, whereby a sinuous path $b$ is formed for the passage of the steam. Between the adjacent groups of protuberances there is a certain amount of space so that oil drainage channels $c$ are formed.

Inside the pear shaped protuberances of the partition walls $e$ there are tubes $d$ so that oil channels $e$ are formed inside the protuberances. This arrangement affords on both sides of the steam path continuous oil channels $c$ and $e$ which are entirely protected from the steam.

Semi-circular grooves $f$ are formed by indentations in the partition walls and provide channels directly adjacent to the path of the steam but outside the direct current of the steam. These grooves $f$ have horizontal apertures $g$ affording communication between the steam passages and the oil channels $c$ and $e$. The grooves $f$ in the partition walls $a$ also serve as distance pieces between the walls and the tubes $d$. The internal structure of partition walls and tubes rests on a corrugated base, or bed-plate, so that it stands on ridges $h$ sloping downward to horizontal oil channels $i$ which are transverse to the direction in which the steam flows through the separator. The ducts $i$ are provided with long apertures $k$ having depending lips which facilitate the discharge of the mixture of oil and water of condensation. Instead of being corrugated the base plate may be provided with bosses for supporting the internal structure, and with round openings.

The action of the apparatus is as follows: Steam entering the separator immediately distributes itself in the various steam passages $b$ and a mixture of oil and water is deposited on the whole surface of the partition walls. This mixture is forced by the current of steam into the grooves $f$, where, removed from the direct impact of the steam, it descends and passes through the holes $g$ into the steamless chambers $c$ and $e$, in which the said mixture is completely protected from the current of steam. The mixture flowing out of these chambers passes into the bed-plate where the draining surface rapidly and effectively conducts it into the oil grooves $i$, where it is also removed from the impact of the steam owing to the depth of the grooves. From the latter the mixture flows by way of the holes $k$ into the collecting chamber.

Having fully described my invention, what I desire to claim, and secure by Letters Patent, is:

1. An apparatus for separating oil from steam provided with a steam path, continuous separate oil draining chambers arranged at both sides of the steam path but outside the passage of the steam, a collecting chamber, and a bed plate for conducting the separated oil into said collecting chamber.

2. An apparatus for separating oil from steam, provided with a steam path, continuous separate oil draining chambers arranged at the both sides of the steam path, but outside the passage of the steam, said chambers having pear shaped protuberances projecting from them arranged in staggered relation to one another, and having semi-circular grooves with horizontally disposed mouths formed in the chambers.

3. On apparatus for separating oil from steam, provided with a steam path, continuous separate oil draining chambers arranged at the both sides of the steam path, but outside the passage of the steam, said chambers having pear shaped protuberances projecting from them arranged in staggered relation to one another, and having semi-circular grooves with horizontally disposed mouths formed in the chambers, and tubes inserted in the pear shaped protuberances.

4. An apparatus for separating oil from steam provided with a steam path, contiguous separate oil draining chambers arranged at both sides of the steam path but outside the passage of the steam, and a bed plate serving as an oil conducting organ and having channels forming deep gutters placed closely together.

In testimony whereof I have signed my name to this specification in the presence of two subscribing witnesses.

HEINRICH OSKAR WISCHNER.

Witnesses:
PAUL GABLER,
RUDOLPH FRICKE.